(12) United States Patent
Doi

(10) Patent No.: US 8,892,991 B2
(45) Date of Patent: Nov. 18, 2014

(54) ENCODER COMPILER, COMPUTER READABLE MEDIUM, AND COMMUNICATION DEVICE

(75) Inventor: Yusuke Doi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/235,834

(22) Filed: Sep. 19, 2011

(65) Prior Publication Data

US 2012/0254724 A1 Oct. 4, 2012

(30) Foreign Application Priority Data

Mar. 28, 2011 (JP) .................................. 2011-70193

(51) Int. Cl.
*G06F 3/00* (2006.01)
*G06F 17/27* (2006.01)

(52) U.S. Cl.
CPC .................................. *G06F 17/272* (2013.01)
USPC ........................................................ 715/234

(58) Field of Classification Search
USPC .................. 715/234, 243, 254, 255
See application file for complete search history.

(56) References Cited

U.S. PATENT DOCUMENTS

| 8,291,392 | B2 * | 10/2012 | Li et al. ........................ | 717/143 |
| 2001/0056504 | A1 | 12/2001 | Kuznetsov | |
| 2009/0125693 | A1 * | 5/2009 | Idicula et al. ................. | 711/170 |
| 2010/0287460 | A1 * | 11/2010 | Denoual et al. ............... | 715/234 |

FOREIGN PATENT DOCUMENTS

| JP | 10-240652 A | 9/1998 |
| JP | 2003-518291 A | 6/2003 |
| JP | 2010-267092 A | 11/2010 |
| WO | WO 01/46837 A2 | 6/2001 |

OTHER PUBLICATIONS

"Efficient XML Interchange (EXI) Format 1.0," Dec. 8, 2009, available from <http://www.w3.org/TR/2009/CR-exi-20091208/>, pp. 1-120.*
Japanese Office Action dated Apr. 12, 2013 (and English translation therof) in counterpart Japanese Application No. 2011-070193.

* cited by examiner

Primary Examiner — Kyle Stork
(74) Attorney, Agent, or Firm — Holtz, Holtz Goodman & Chick, PC

(57) ABSTRACT

The reading unit reads mapping information that maps a particular point in a document structure defined by XML schema to the name of a variable and a training XML document that includes a substitute character string positioned at a particular point and tags. A parser converts the training XML document into a sequence of events each specifying one of substitute character string and the tag names. The reading unit reads in an EXI grammar form. A code composer processes the sequence of events and generates an EXI event code based on the EXI grammar form, generates a function to retrieve the value of a variable mapped to the particular point at which the substitute character string is positioned when the event is an event specifying substitute character string, and produces an EXI encoder including output instruction codes to output EXI event codes and the retrieved value of the function.

9 Claims, 10 Drawing Sheets

US 8,892,991 B2

ENCODER COMPILER, COMPUTER READABLE MEDIUM, AND COMMUNICATION DEVICE

CROSS REFERENCE TO RELATED APPLICATIONS

This application is based upon and claims the benefit of priority from the prior Japanese Patent Application No. 2011-70193, filed on Mar. 28, 2011, the entire contents of which are incorporated herein by reference.

FIELD

An embodiment of the present invention relates to an encoder compiler and a computer readable medium for producing an EXI (Efficient XML (Extensible Markup Language) Interchange) encoder, and a communication device including the EXI encoder.

BACKGROUND

Decoders that generate a decoder program through interpretation by a finite state machine based on ASN. 1 are known.

It is conceivable to produce an EXI encoder through a similar process. An EXI encoder converts a text XML document to a binary format according to EXI specifications for efficient exchange of XML documents.

To correctly map bit strings generated by the EXI encoder to elements in the XML document when such an EXI encoder is used, it is necessary to prepare all items in the original XML document for encoding in advance, which results in an increased amount of code. Such an EXI encoder is not suited for inclusion into an embedded device with limited resources.

DETAILED DESCRIPTION

According to an aspect of embodiments, there is provided an encoder compiler that produces an EXI encoder, the EXI encoder generating an EXI (Efficient XML (Extensible Markup Language) Interchange) stream.

The encoder compiler includes a first reading unit, a second reading unit, a parser, a third reading unit and a code composer.

The first reading unit reads mapping information that maps a particular point in a document structure defined by XML schema to a name of a variable.

The second reading unit reads a training XML document, the training XML document including a substitute character string positioned at the particular point and a plurality of tags having at least tag names.

The parser converts the training XML document into a sequence of events each of which specifies one of the substitute character string and the tag names.

The third reading unit reads an EXI grammar form defining relationship between inter-event transition and EXI event code.

The code composer sequentially processes the sequence of events and generates EXI event codes in accordance with the EXI grammar.

The code composer, when an event being processed is an event which specifies the substitute character string, generates a function which retrieves a value of the variable mapped to the particular point at which the substitute character string is positioned.

The code composer produces an EXI encoder by arranging output instruction codes for the EXI event codes and output instruction codes for the value of the function in accordance with an order of sequence processing of the events.

The embodiments will be described below with reference to drawings. At the end of the specification, Sections A.1 through A.6 are included as sample data, which will be referenced where appropriate.

Figure 1:
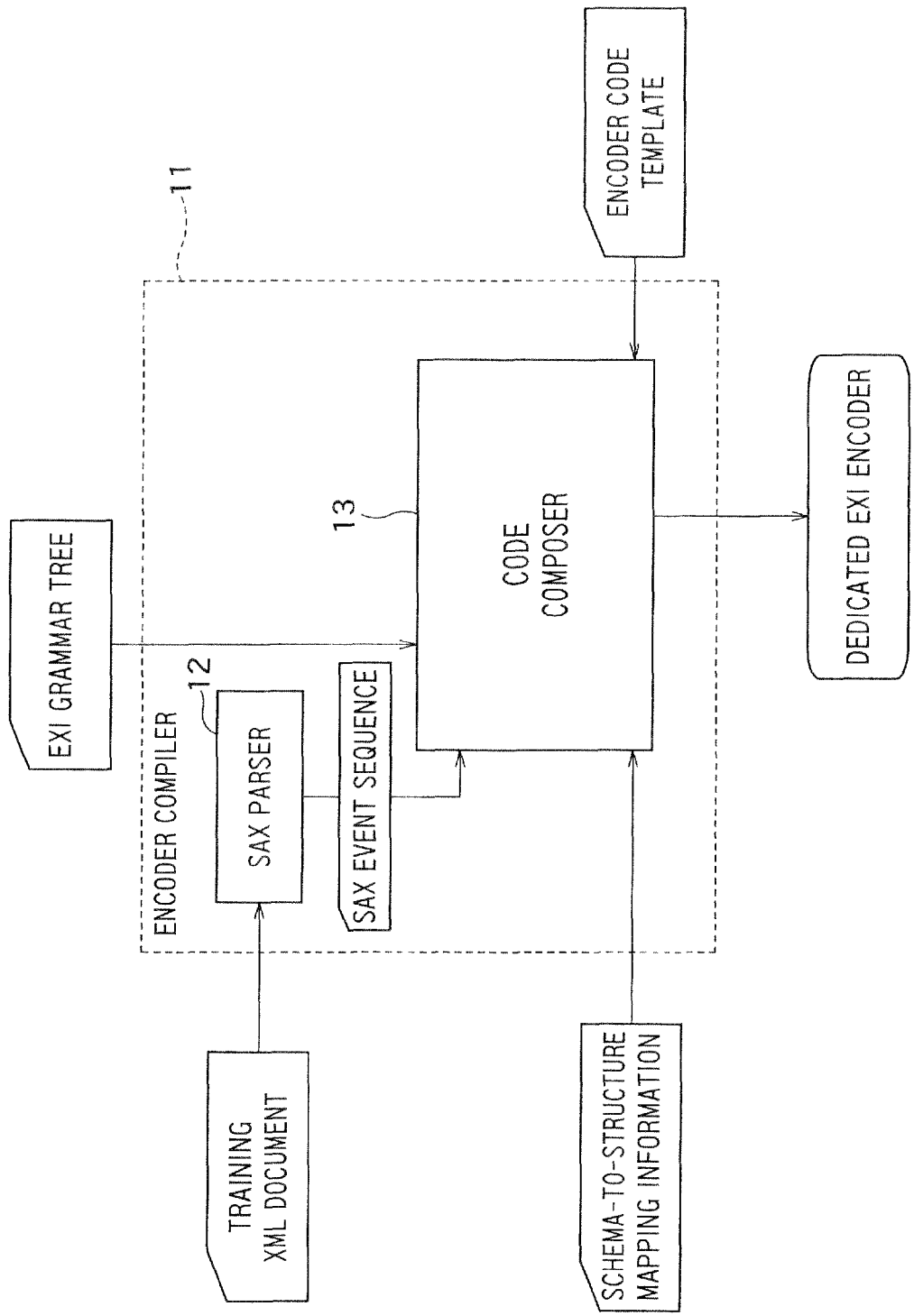
FIG. 1 shows a configuration of an encoder compiler according to an embodiment of the invention.
Figure 2:
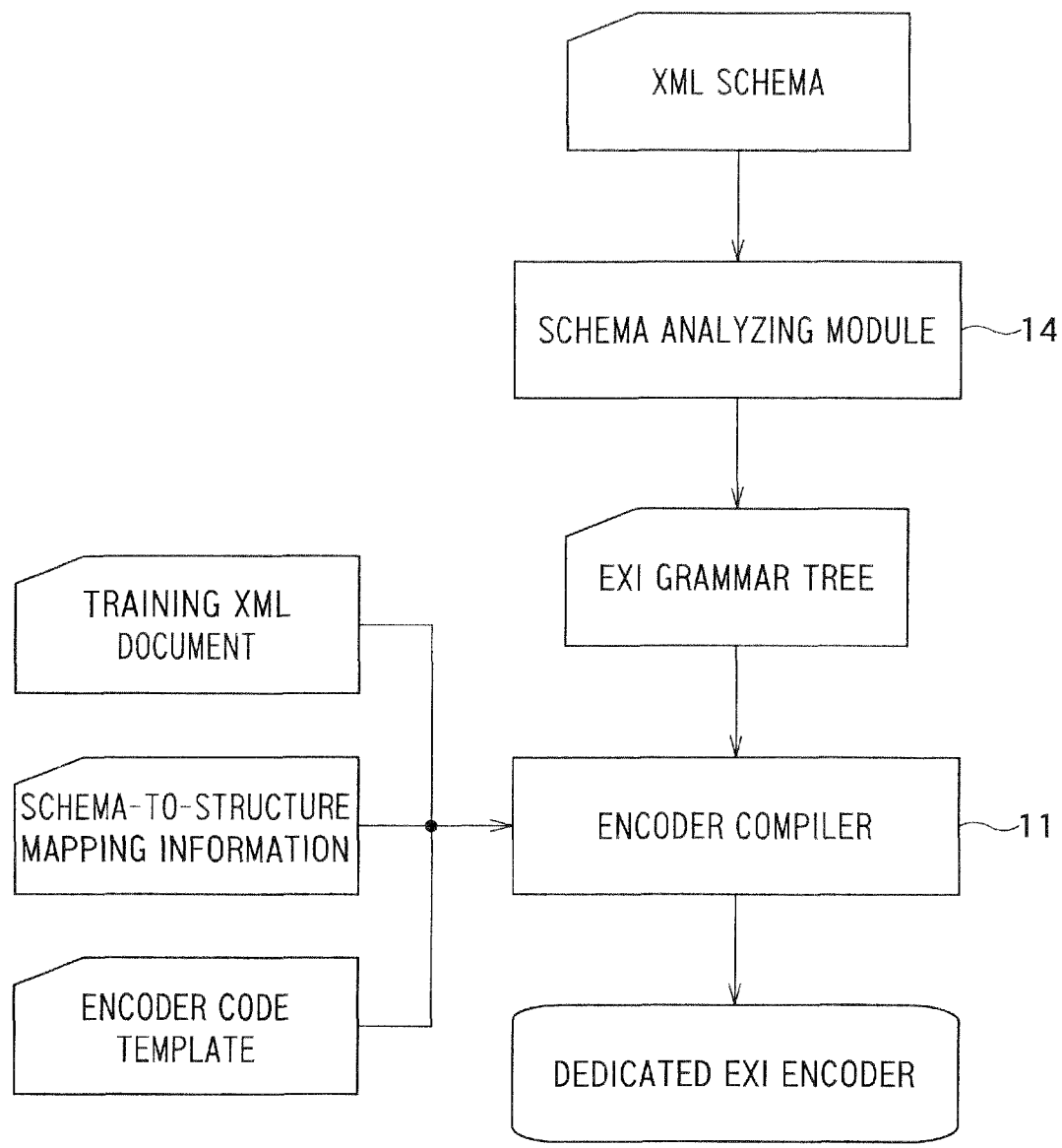
FIG. 2 is a flowchart illustrating an overall flow up to generation of an EXI encoder.

FIG. 1 shows a configuration of an encoder compiler (an encoder generator) according to an embodiment of the invention, and FIG. 2 shows an overall flow up to generation of an EXI encoder.

An encoder compiler 11 produces an EXI encoder for generating an EXI stream. The EXI encoder will be included in a communication device with limited resources, e.g., a smart meter. The communication device including the EXI encoder can generate an EXI stream just by executing the EXI encoder without involving an XML document or XML schema.

For a communication device to generate an EXI stream according to a traditional practice, it is required to create an XML document in which values that the communication device wants to send to the other party are written and interpret the XML document based on XML schema. This way of processing, however, places heavy load on a device with limited resources (e.g., a smart meter). After transmission to the other device, the EXI stream is reconstructed into the XML document on the device based on XML schema.

The embodiment of the invention is intended to solve the problem, and enables generation of an EXI stream containing values to be sent to the other party (in this embodiment, values of elements in a structure) just by executing an EXI encoder based on the values, and proposes means that generates such an EXI encoder (hereinafter, a dedicated EXI encoder). This allows an EXI stream compliant with normative XML to be generated without placing much load on a device with limited resources.

As shown in FIG. 1, the encoder compiler 11 receives an EXI grammar tree generated from a particular XML schema, a training XML document which is an XML document conforming to that XML schema, schema-to-structure mapping information, and an encoder code template as inputs, and outputs an EXI encoder (a dedicated EXI encoder). The encoder compiler 11 includes a first reading unit that reads in schema-structure mapping information, a second reading unit that reads in a training XML document, and a third reading unit that reads in an EXI grammar tree. The first to third reading units may read into the same or different storage devices. Reading may be performed via a network.

XML schema defines the document structure of an EXI stream to be output by the dedicated EXI encoder. It also defines the document structure of the training XML document.

Section A.5 shows an example of XML schema used in this description. The exemplary schema is cited from Reference Literature 1 (John Schneider and Takuki Kamiya, Efficient XML Interchange (EXI) Format 1.0. W3C Candidate Recommendation, December 2009, http://www.w3.org/TR/exi/).

As shown in FIG. 2, XML schema is converted into an EXI grammar tree by a schema analyzing module and the EXI grammar tree is given to the encoder compiler 11. For the EXI grammar tree, reference may be made to Reference Literature 1, 8.5 Schema-informed Grammars. The EXI grammar tree is data that represents the grammars described in Appendix H of Reference Literature 1 in a tree structure. Section A.6 shows an example of EXI grammar used in this description (cited from Reference Literature 1), showing the grammar for "order" ("Complete grammar for element <order>") and that for "product" ("Complete grammar for element <product>"). In each grammar, further detailed grammars are defined. "Term_product 0,0", "Term_product 0,1" in the grammar for <order> and "Use_color0" in the grammar for <product> are grammar names.

The EXI grammar consists of four portions: LeftHandSide, Terminal, NonTerminal, and EventCode. If a Terminal event occurs in LeftHandSide state, EventCode is output and transition to NonTerminal state takes place. As described later, this embodiment assumes use of SAX (Simple API for XML, http://www.saxproject.org/) as an interpretation model for XML documents and generates EXI events from SAX events.

For example, a start event for order, SE ("order"), is read and a grammar corresponding to <order> is selected (this state is denoted as "Term_order"). If an SE ("product") event occurs in this state, 0 (one-bit zero) is output as an event code, transition to Term_product 1,0 takes place, and a grammar for "product" is selected (this state is denoted as "Term_product"). Processing is similarly repeated every time there is an event. Upon occurrence of an EE event, the above-described state of grammar for "order", Term_product 1,0, is again entered from the grammar for "product" and processing is continued in the same manner. An EXI event code is represented by a set of one or more variable-bit-width non-negative integers. Each event number is expressed by non-negative integer(s) having a bit width that is required and sufficient for representing the combination. Specifically, the bit width will be 3-bit if the maximum event number for a certain grammar is 7, and 4-bit if event numbers are from 8 to 15, and so on. An event code made up of two or more event numbers separated by periods, such as "1.0", "2.1", or "2.4.1", is a hierarchical event code and is represented by combining variable-bit-width, non-negative integers (having a bit with required and sufficient for each hierarchy level) as many as the number of hierarchy levels. In the example of Section A.6, no tag name is specified for EE event, which definitely means the end of the tag specified by the current grammar.

A training XML document defines contents of output from the dedicated EXI encoder. XML schema defines formats permitted for a document, whereas a training XML document defines more specific details on a document to be output.

In this embodiment, among values included in output, invariant portions such as constants (when tag name, attribute value, and/or body text (e.g. text fragments as contents of tags) are constants (the example of Section A.1 includes no attribute value and/or body text that is a constant) are directly written in the training XML document. For a varying value (e.g., temperature measurement and time for a temperature sensor, or model number, quantity and price for a product), a substitute character string (an identifier) that functions as a pointer is described.

A substitute character string is described in a portion of body text surrounded by a start tag and an end tag or at a point of a tag attribute value, for example. Section A.1 shows an example of a training XML document, where @SKU@, @COLOR@, @QUANTITY@, and @PRICE@ each represent a substitute character string (an identifier).

Schema-to-structure mapping information defines to which portion of XML schema and the training XML document an element of a structure as input is mapped. Schema-to-structure mapping information specifically includes the elements shown below. In addition, Section A.2 shows an example of schema-to-structure mapping information used in this description. When there is only one element, a structure does not have to be used and a variable may be defined. An element of a structure may also be called a variable in this embodiment.

Target tag: an absolute path for a tag corresponding to a "structure" (represented by XPath with no omission or wildcard). In other words, it is designation of a range in which the structure is positioned in document structure.

Structure definition: definition of a structure as input (utilizing C-language definition, for example), including the name of the structure, and the name and type of elements in the structure. "Struct product" is the structure name.

Converting function: a function to specify the type in which the value of each structure element is written at the corresponding point in the training XML document. If a structure element and the corresponding point in the training XML document have the same type, no conversion is required and a function to obtain only the value of the structure element may be used.

In the example of Section A.2, "sku", "color", "quantity", and 'price' are structure names, and "w_char*", "int", and "float" represent structure types.

In the substitute character string scheme, a character string (an identifier) that is the same as in the training XML document, such as @SKU@, is described so as to be mapped to the name of a structure element. "wchar2utf8" represents a function that converts w_char type into utf8 type used in XML schema. For example, "w_char *sku->wchar2utf8" denotes a function that converts the value of a structure element "sku" of w_char type into utf8 type.

Thus, the encoder compiler 11 according to the embodiment of the invention produces a dedicated EXI encoder for generating an EXI stream in which the values of specified structure elements are written in specified types at certain positions (i.e., at which substitute character strings are located) in a training XML document based on a particular XML schema. An EXI stream is also called an EXI event sequence.

Figure 3:
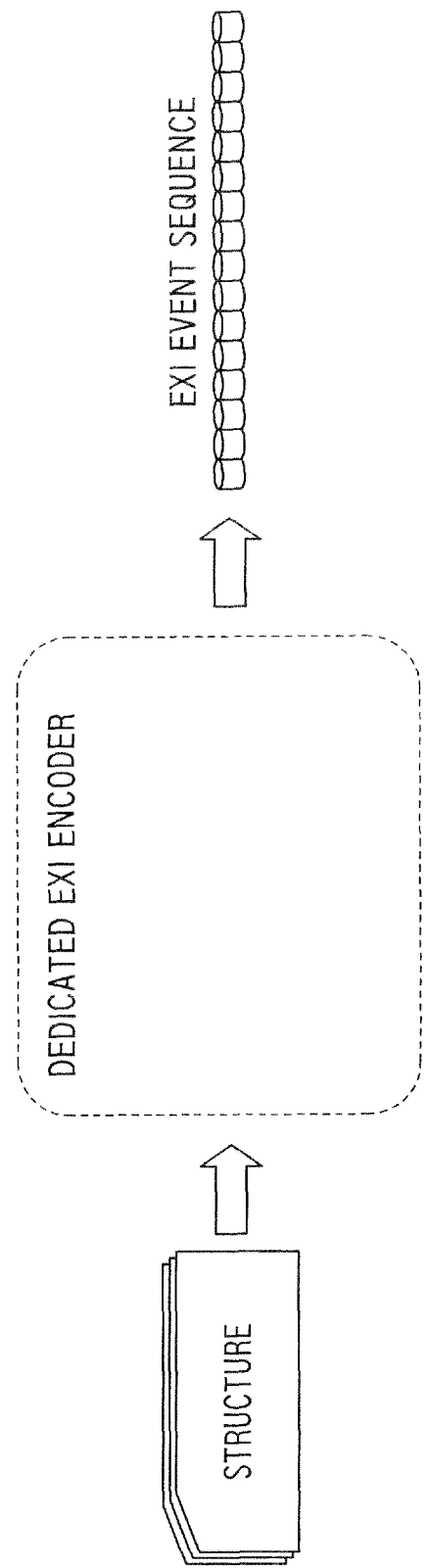
FIG. 3 shows output of an EXI stream in response to execution of a dedicated EXI encoder.

The dedicated EXI encoder is included into a communication device as mentioned above and, with one or more structures as input, executed on the communication device to output an EXI stream. This is illustrated in FIG. 3. The EXI stream is a sequence of EXI event codes and values.

The EXI stream generated on the communication device is transmitted to the other device. The EXI stream is decoded on the device based on XML schema (more specifically an EXI grammar tree generated from XML schema) to yield an XML document in which structures are stored in certain portions of the training XML document. Note that a BODY portion (e.g., the portion surrounded by "product" tags in Section A.1, described in more detail later) can be repeated a number of times (see FIG. 5 described below). In that case, an EXI stream is sent that is generated by converting an XML document in which a BODY portion of the training XML document is repeated. An example of XML document with repeated BODY portions is shown in Section A.4.

As shown in FIG. 1, the encoder compiler 11 includes an SAX parser 12 and a code composer 13.

The SAX parser 12 converts a training XML document into an SAX event sequence.

The SAX parser 12 parses the training XML document from its beginning and generates an SAX event sequence that represents the start of the document, start of an element, attributes, the end of the element, the end of the document, and so forth. SAX event types include tag start event (including attribute information), tag end event, and character string event.

For example, the tag start event indicates the start of a tag and specifies the name of the tag as well as the name and value of an attribute included in the tag. This SAX event corresponds to SE ("product") or AT ("color") in an EXI event. The tag end event indicates the end of the current tag. It corresponds to EE in EXI. The character string event specifies a character string. It corresponds to CH events in EXI. As SAX is well known, it is not described in further detail. Also, for simplicity of description, an SAX event given will be hereinafter denoted with a corresponding EXI event as shown above.

The SAX event sequence generated by the SAX parser 12 is input to the code composer 13. Although this embodiment shows an example of conversion to SAX events, this is not limitation and any method that can convert an XML document into an event sequence may be employed.

An SAX event sequence generated by converting a training XML document can be internally divided into three portions:

(1) an SAX event sequence up to just before a tag specified by schema-to-structure mapping information (in this example, just before <product>);

(2) an SAX event sequence made up of one or more repetitions of the specified tag; and (3) an SAX event sequence from immediately after the end of the specified tag (in this example, immediately following </product>) to the end of the document.

In the example of Section A.2, schema-to-structure mapping information specifies "/order/product", thus designating the product tag, which is under the order tag.

Figure 5:
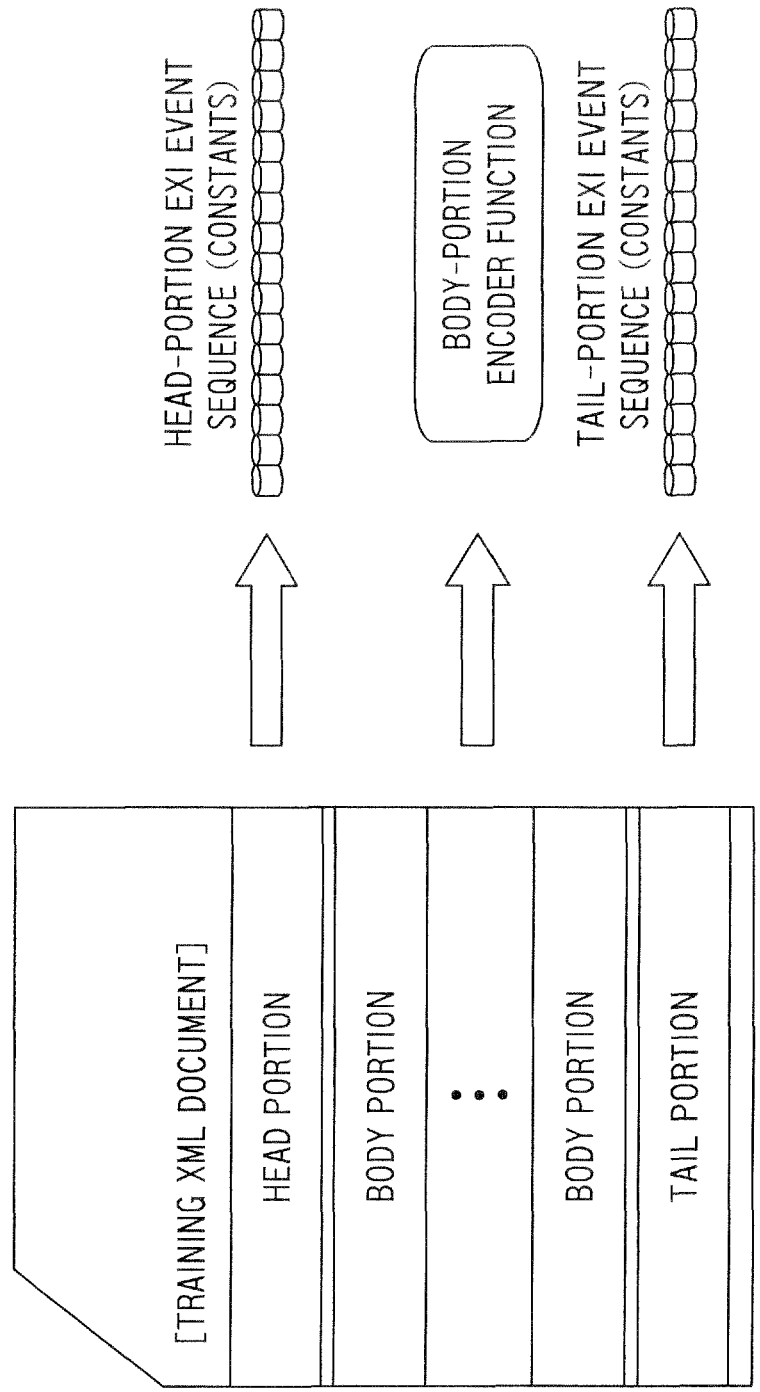
FIG. 5 shows relationship between a training XML document, and HEAD, BODY and TAIL portions.

This description refers to the event sequence of (1) as HEAD portion, (2) as BODY portion, and (3) as TAIL portion. The relationship between the training XML document, and HEAD, BODY and TAIL portions is shown in FIG. 5. Section A.3 shows examples of HEAD, BODY, and TAIL portions, which are determined from the training XML document shown in Section A.1 and the schema-to-structure mapping information shown in Section A.2.

The code composer 13 generates an output instruction code for sequentially converting an SAX event sequence into EXI events from the beginning of the sequence, processing the events based on the EXI grammar tree, and generating a corresponding EXI stream each time it processes an event. When an event being processed is an event for which a substitute character string is specified, a function to retrieve and convert the value of a structure element corresponding to the position at which the substitute character string is placed is generated (conversion need not be performed when no type conversion is required). Then, a dedicated EXI encoder is produced by arranging or combining output instruction codes for EXI event codes and output instruction codes for the value of the function in accordance with the order of event sequence processing. The code composer 13 is described in greater detail below.

While performing processing, the code composer 13 monitors the state of a stack (which corresponds to full path of XPath or inclusion relationship between XML tags) of a finite state machine for grammar analysis it includes.

When a varying element (i.e., a substitute character string) is not included in HEAD and TAIL portions, a fixed EXI event sequence will be respectively provided. Meanwhile, since a BODY portion includes varying elements (i.e., substitute character strings), it is required that structure values can be inserted into an EXI stream on the communication device. If HEAD and TAIL portions include varying elements, an instruction code can be generated that outputs a dynamic EXI event sequence through an algorithm similar to the one used for BODY portion disclosed by the invention.

The code composer 13 produces a "dedicated EXI encoder" on the basis of an EXI event sequence that results from processing on an event sequence and stack status at the time of each processing step.

In doing so, the code composer 13 uses an encoder code template. The encoder code template stores code templates necessary for describing converting functions, such as "wchar2utf8" shown earlier, and/or programs (instruction codes).

For example, an instruction code to write an EXI stream generated from an SAX event sequence in the HEAD portion is written in encode_Head( ), which is a HEAD-portion output function. Bits of the EXI event sequence generated from the HEAD portion are written inside encode_Head( ), which is then executed to output an EXI event sequence corresponding to the HEAD portion on the communication device.

An instruction code to write an EXI stream generated from an SAX event sequence in the TAIL portion is described using encode_Tail( ), which is a TAIL-portion output function. Bits of the EXI event sequence generated from the Tail portion are written inside encode_Tail( ), which is then executed to output an EXI event sequence corresponding to the Tail portion on the communication device.

Likewise, for the body portion, an instruction code to write an EXI stream generated from a BODY portion is described using encode_Body( ), which is a BODY-portion output function. Here, it is necessary that a structure value that is read out on the communication device be loaded (e.g., from an internal storage of the communication device) and encoded into a format specified by schema through wchar2utf8 function or the like to be written out. For example, for a structure member (assumed to be order->sku), an instruction code (a function), such as wchar2utf8 (&(order->sku)), is inserted. (This means the address of "sku" member of structure "order" is passed to the wchar2utf8 function). In this case, when the dedicated EXI encoder is executed on a communication device, an EXI event sequence is sequentially read and written in response to execution of encode_Body( ). But when wchar2utf8(&(order->sku)) is read out along the way, it is executed to read out a value corresponding to "sku" and the value is converted into utf8 type and written out. If there is any following EXI event, the EXI event is written out. More detailed configuration of the BODY-portion output function will be shown below.

The forms of describing functions shown here are just examples and this embodiment is not limited to these examples.

Figure 4:
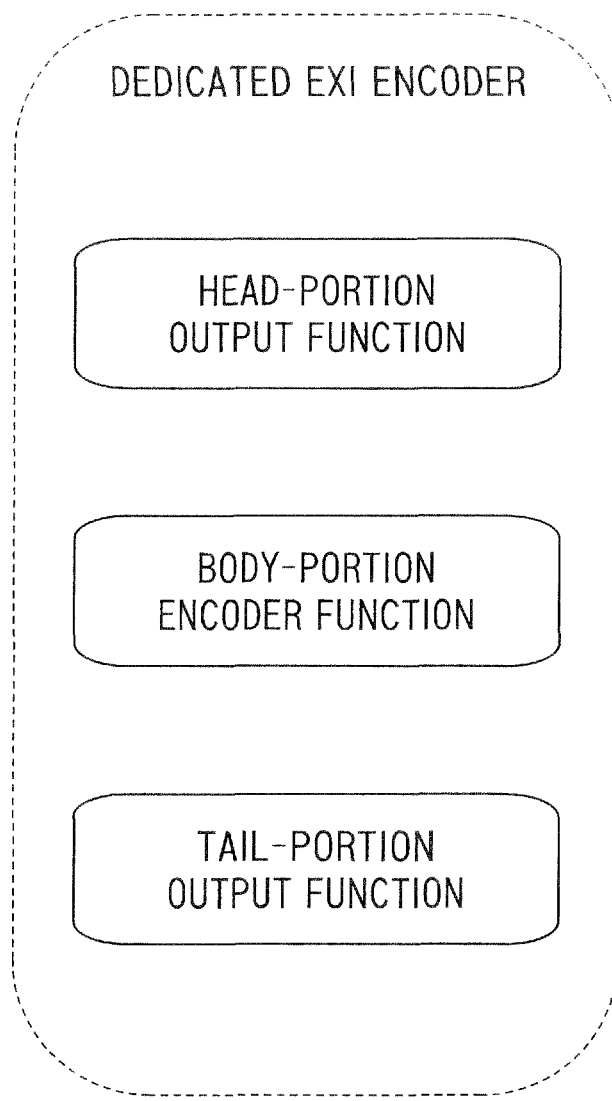
FIG. 4 shows an exemplary configuration of an EXI encoder.

An exemplary configuration of a program written so as to execute encode_Head( ), encode_Body( ), and encode_Tail( ) in sequence is shown in FIG. 4. If necessary, a definition file for structures (e.g., "sku", "color") may be additionally described. Concatenation of results of executing encode_Head( ), encode_Body( ), and encode_Tail( ) provides an EXI stream as output, and the communication device sends it to the other device.

The code composer 13 generates a dedicated EXI encoder that includes these definition files and programs. The communication device executes the dedicated EXI encoder to automatically generate an EXI stream which includes retrieved structure values based on structure values residing in the memory.

Figure 6:
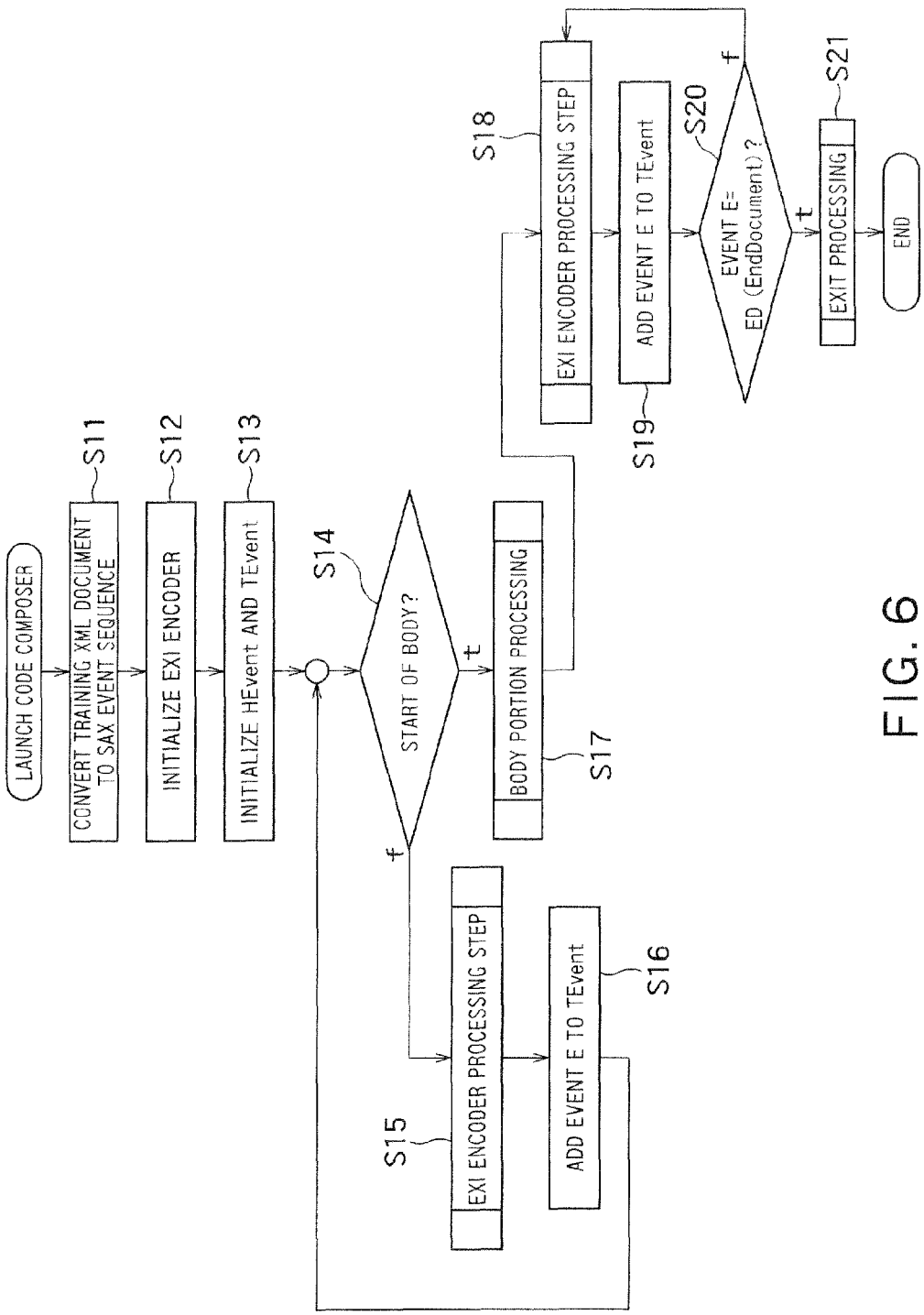
FIG. 6 is a flowchart illustrating operation of an encoder compiler.

FIG. 6 is a flowchart illustrating the operation of the encoder compiler 11.

The encoder compiler 11 converts a training XML document into an SAX event sequence through the SAX parser 12 (S11). The encoder compiler 11 also initializes the dedicated EXI encoder (S12).

An event list corresponding to HEAD portion "HEvent" and an event list corresponding to TAIL portion "TEvent" are initialized (S13). These lists store EXI-event bit strings obtained from HEAD and TAIL portions, respectively.

Bits in the lists are handled as constants and functions for outputting the bits, encode_Head( ) and encode_Tail( ), are described in the program for the dedicated EXI encoder which will be output as mentioned above.

The encoder compiler 11 processes the SAX event sequence from its beginning and constructs a grammar stack as it processes SAX events. This stack is equivalent to XPath represented in full path, and processing on the BODY portion is started when the stack agrees with a "target tag" described in schema-to-structure mapping information ('product' tag in the example of Section A.2) (S17).

Any SAX event before starting processing on BODY portion is processed as the HEAD portion (false at S14). For processing of the HEAD portion, "EXI encoder::processing step" (described below) is performed once (S15), and the result is stored in the event list, "HEvent" (S16). This process is continued until the grammar stack for the EXI encoder agrees with the "target tag."

When the grammar stack agrees with the "target tag," SAX events are processed through "BODY portion processing" while the grammar stack continues (S17). This process will be described later as it is complicated.

When processing on the BODY portion is complete, a grammar (a state) that can possibly correspond to TAIL portion can be obtained. The grammar is stored and the remaining SAX event sequence (i.e., the TAIL portion) is converted into an EXI event sequence up to the end of the document, and the events are stored in the list "TEvent" (S18, S19, S20). When multiple grammars are present in the TAIL portion, "TEvent" is created for each of the grammars.

For an exit process (S21), a dedicated EXI encoder is generated using constants in the HEAD portion (data in "HEvent" list), an encoder dictionary for BODY portion (described later), and constants in the TAIL portion (data in "TEvent" list).

Figure 7:
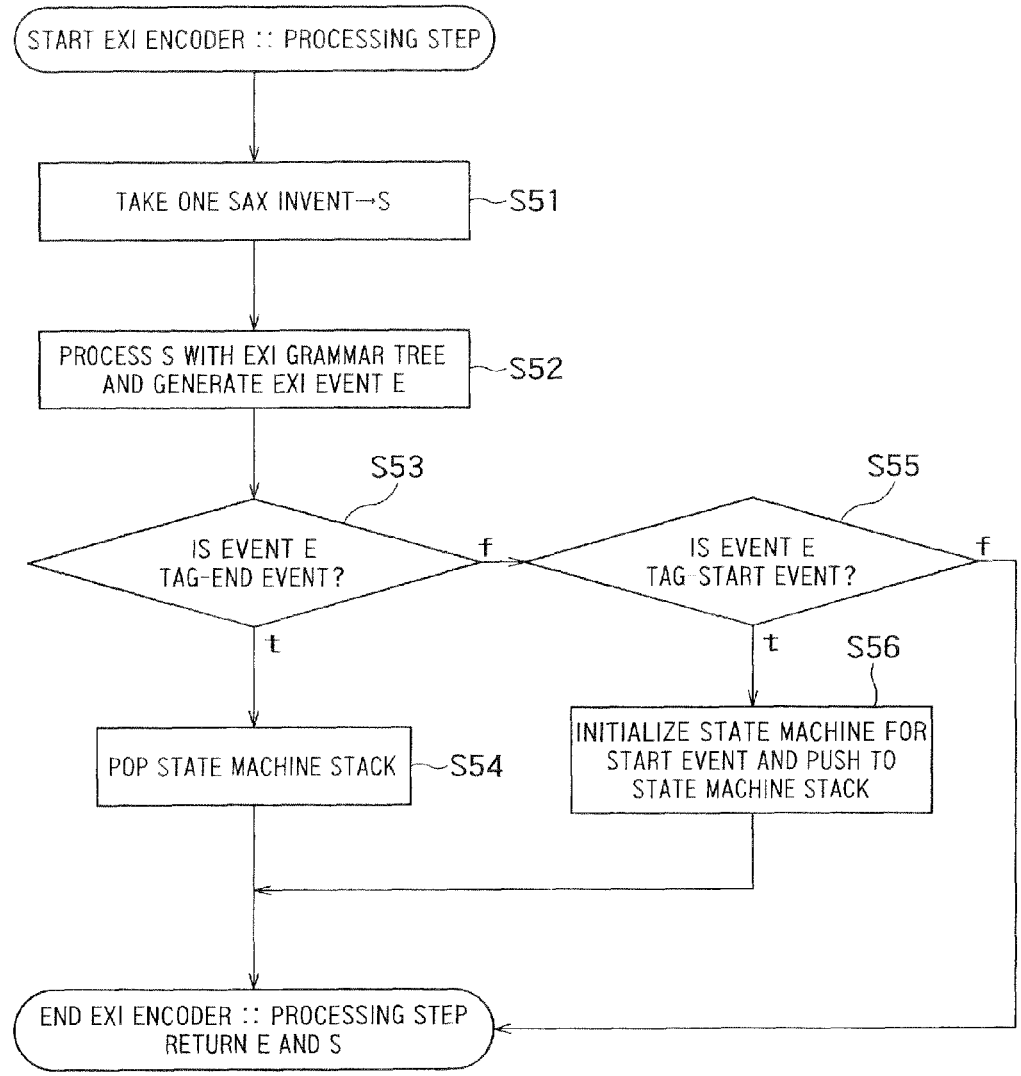
FIG. 7 is a flowchart of SAX event processing by the encoder compiler.

FIG. 7 shows a flowchart of SAX event processing ("EXI encoder::processing step") performed in the encoder compiler 11.

A feature of the embodiment of the invention is to change the mode of EXI encoding in accordance with the contents of the training XML document, so processing is performed on a per-SAX-event basis.

The encoder compiler 11 is required to manage the stack of a state machine based on grammar structure, which is explicitly shown by the flowchart.

Processing of each individual event is based on a known technique, such as shown in Chapter 6 of Reference Literature 1 ("Encoding EXI Streams").

Each time an SAX event is retrieved (S51), the SAX event (or the corresponding EXI event) is processed according to the EXI grammar tree and part of an EXI stream (a sequence of event codes and values) is generated (S52).

If the EXI event corresponds to the end of a tag ("true" at S53), a state transition stack is popped (S54).

If the EXI event corresponds to start of a tag ("true" at S55), a state machine corresponding to start event is initialized and the event is pushed to the state machine stack (S56).

If the EXI event corresponds neither tag end nor tag start, nothing is performed on the state machine stack and the flow ends. This can be the case when the EXI event corresponds to AT or CH event, for example.

Figure 8:
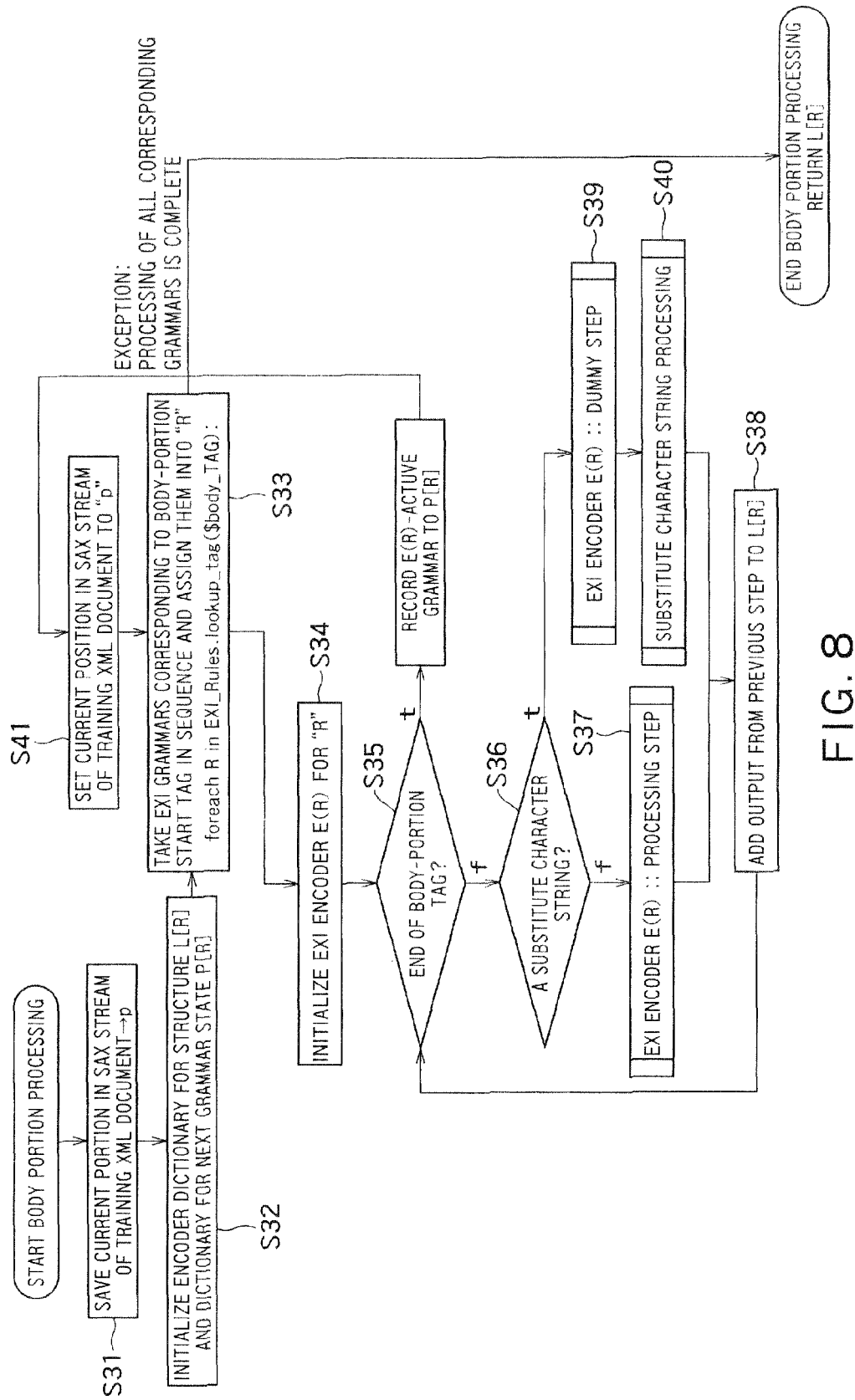
FIG. 8 is a flowchart illustrating the flow of processing of BODY portion by the encoder compiler.

FIG. 8 is a flowchart illustrating the flow of processing of a BODY portion (S17 in FIG. 6) performed by the encoder compiler 11.

One BODY portion is given from the training XML document. The BODY portion is recursively processed a number of times to find possible grammars and sub-encoders corresponding to the individual grammars are generated. That is, while the example of Section A.1 includes one BODY portion, encoding of the BODY portion needs to be repeated when the content of Section A.4 is what the communication device actually wants to transmit. Because the same grammar is not always used on each repetition, BODY-portion encoders (sub-encoders) corresponding to individual possible grammars are generated.

Figure 9:
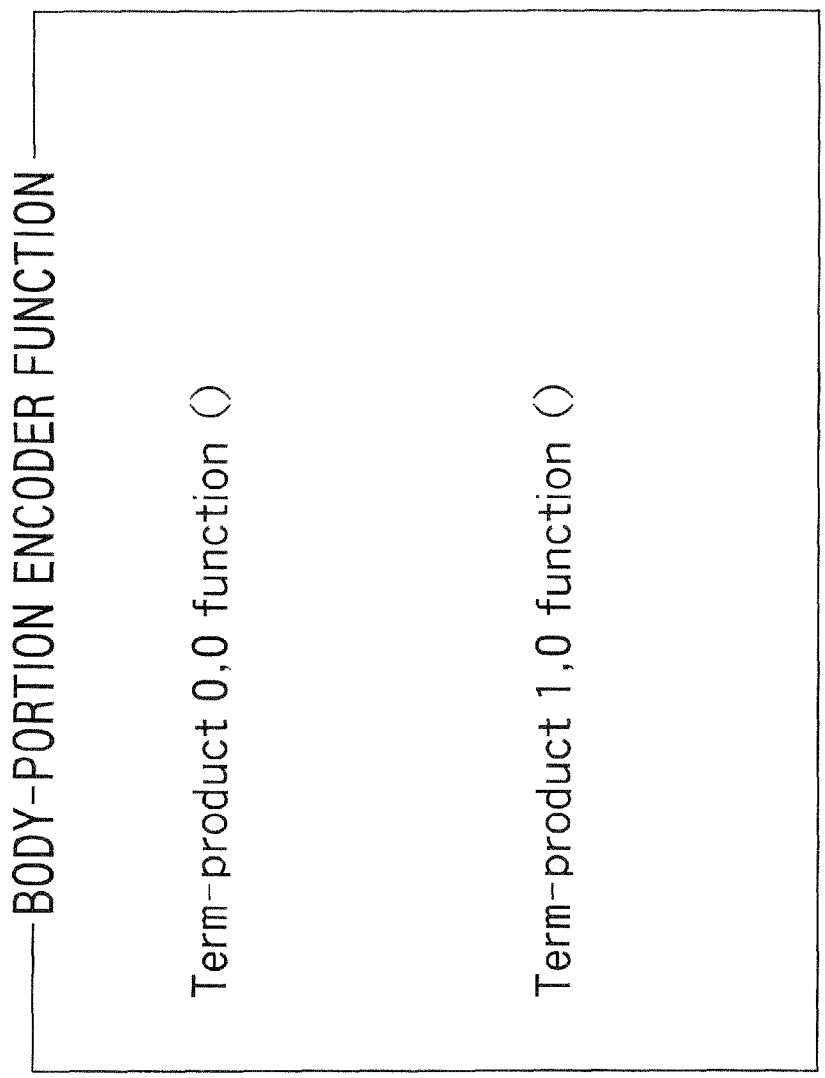
FIG. 9 shows an exemplary configuration of an encoding function for BODY portion.

In the example of Section A.6 for instance, while Term_product 0,0 is used for the first BODY portion, Term_product 1,0 is used for the second and subsequent BODY portions. Thus, for subsequent processing in the examples of Sections A.6 and A1, a BODY-portion encoder function is generated that includes an encoder for the first BODY portion (a Term_product 0,0 function) and an encoder for application to the second and subsequent BODY portions (Term_product 0,1 function), as shown in FIG. 9. In the context of three repeated BODY portions in the example of Section A.4, this is equivalent to applying Term_product 0,0 function to the first body portion and Term_product 0,1 function to the other BODY portions in encoding into EXI.

Thus, since BODY portions can be encoded a number of times with different grammars, SAX stream position "p" at the time of starting processing the BODY portion is recorded (S31), and stream position is returned to "p" later (S41).

A dictionary with grammar "R" as key is denoted as L[R]. L[R] is a dictionary for BODY-portion sub-encoders used in a completed encoder (a dedicated EXI encoder). A sub-encoder includes the ability to convert an input structure into an EXI bit string.

Except for a grammar for which completion has been fixed (i.e., corresponding to a tag for which "maxOccurs" (maximum number) is finite as defined by schema and which has appeared for the maxOccurs-th time), a grammar for use is determined when a structure following the current structure is input. Thus, a sub-encoder also has dictionary P[R] for the next grammar.

Of all grammars, ones corresponding to the start tag for a BODY portion (e.g., <product>) are sequentially assigned to "R" and the following process is performed.

First, for each grammar, an independent individual encoder is initialized. However, because "R" is selected as the initial grammar among grammars generated from XML schema, the individual encoder is denoted as E(R) here.

The following process is continued until the SAX event sequence comes to the position at which the BODY portion tag ends ("false" at S35).

Processing on the BODY portion for each grammar branches depending on whether a "substitute character string" is included in SAX events (S36). A substitute character string corresponds to "@NAME@" in the example of training XML as mentioned above. A substitute character string is permitted for an attribute or body text surrounded by tags. The schema-to-structure mapping information of Section A.2 shows examples of description using a character string and relative XPath.

If the SAX event does not include a substitute character string, i.e., information about a structure, the SAX event is processed with E(R) (S37), and output of the processing is added to L[R] (S38). If L[R] does not exist, an empty list is initialized and the output is added to the initialized list (the subsequent process is the same).

E(R) is also executed when an SAX event includes a substitute character string, but this is done for causing transition of the state of E(R) and output (i.e., the substitute character string itself) is not used (S39). Then, substitute character string processing is performed (S40).

A substitute character string may be either present in body text (@QUANTITY@ and @PRICE@ in the example of Section A.1) or defined as an attribute within a tag (@SKU@ and @COLOR@ in the example of Section A.1). The mode of substitution (i.e., how to convert the value of which structure element) is determined by schema-to-structure mapping information.

In this case, content is added to L[R] as follows (S38).

For an attribute within a tag, a set of an AT event code (structurecode) generated based on the current grammar, a converting function that converts the value of a structure element such that becomes a type conforming to schema (e.g., "utf8" in "wchr2utf8" in the schema-to-structure mapping information), and an input element pointer specifying an element within the structure that should be input (e.g., "sku" in the schema-to-structure mapping information) is additionally described in L[R].

Meanwhile, for XML body text (such as text surrounded by tags), a CH event code, a converting function, and an input element pointer are registered to L[R] (S38).

The converting function is a function corresponding to a conversion mode taken from schema-to-structure mapping information.

In the example of relative XPath scheme shown in Section A.2, wchar2utf8 which converts w_char type to a utf8 character string corresponds to structure elements "sku" and "color". Int2utf8 which converts "int" type into a utf8 character string corresponds to body text surrounded by "quantity" tags. Float2utf8 which converts float type into a utf8 character string corresponds to body text surrounded by "price" tags.

These functions are required to have a type compliant with a language used for describing the encoder, such as C, as their input and a type permitted in schema as their output. In conformity with the requirements, the functions may be implemented only with simple conversion or may apply some sort of processing within the converting functions (e.g., conversion from local time to GMT).

This process is repeated until the SAX event comes to the position at which the BODY-portion tag ends (S35). When the SAX event is at the position of end of the BODY-portion tag ("true" at S35), processing for the current grammar is ended, the grammar at which E(R) is now positioned is recorded to P[R] (S33), and SAX stream position is returned to "p" (S41), and then the next grammar is processed (S33).

When finally all processing on the BODY start tag is complete, the code composer 13 will have obtained L[R] and P[R]. Pairs of L[R] and P[R] as many as the total number of corresponding grammars will be obtained.

As an exit process (S21 in FIG. 6), code concatenation from L[R] and P[R] is performed as follows.

First, a grammar at the point where processing on the BODY portion starts is assumed to be the initial grammar and an initialization code that has that grammar as its internal state "R" is generated. Then, an instruction code to implement the following process (corresponding to operations performed by the functions in the example of FIG. 9) is stored in the encoder.

1. With the structure defined in schema-to-structure mapping information as input, retrieve contents of L[R] (i.e., a list).

2. Perform the following process from the beginning of the list.

(a) If the subject of processing includes only a constant (e.g., event code bits), output the constant.

(b) If the subject of processing is a set of an input element pointer (pointing to a structure) and a converting function therefor, pass the value pointed by the pointer to the converting function and output the result from the converting function as it is.

(c) When the list has come to its end, terminate the process.

By combining an instruction code to output the contents of event list "HEvent" before this process and an instruction code to output the contents of event list "TEvent" after the process, the encoder is completed.

Using the encoder compiler 11 described above, an efficient dedicated EXI encoder based on a training XML document can be easily generated for grammars given by a particular XML schema. This enables an encoder optimized for a certain device type to be readily created, such as when devices including such an encoder use different functions from one device type to another even with the same XML schema. In addition, training XML can be described to include individual devices' IDs, for example, enabling generation of an encoder optimized for each individual device.

Additionally, an EXI stream compliant with normative XML can be generated on a device with limited resources, such as a smart meter.

Figure 10:
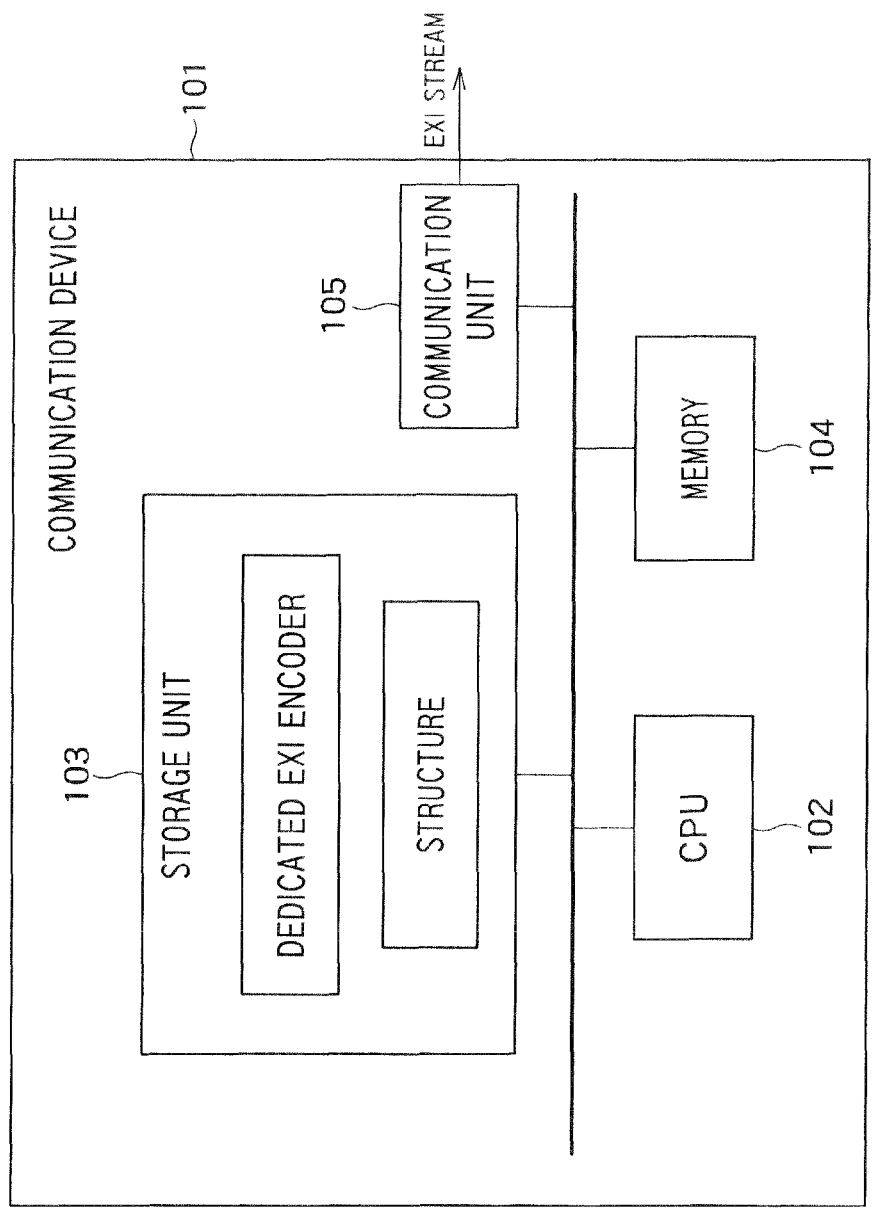
FIG. 10 shows an exemplary configuration of a communication device including a dedicated EXI encoder generated according to the embodiment of the invention.

FIG. 10 shows an exemplary configuration of a communication device incorporating the dedicated EXI encoder produced according to the present embodiment.

The dedicated EXI encoder produced according to the present embodiment is included into a communication device with limited resources, such as a smart meter.

A communication device 101 transmits an EXI stream in which the contents of a desired XML document are encoded to the other device (not shown) for efficient exchange of XML documents with the other device. A CPU 102, which serves as an encoder executing unit, loads the dedicated EXI encoder stored in a storage unit 103 into memory 104 and executes it, thereby generating an EXI stream (EXI event sequence) in which structure values are inserted, as shown in FIG. 3. That is, an EXI stream can be generated through low-load processing without using an XML document or XML schema. A communication unit 105 transmits the EXI stream to the other device via a network. It may also apply encryption and/or authentication as necessary.

Note that the encoder compiler 11 can be realized by using a general computer device as basic hardware, for example. That is, the SAX parser 12 and the code composer 13 included in the encoder compiler 11 may be realized by letting a computer carry out a software (computer program) describing instructions of each process. In this case, the encoder compiler 11 can be realized by previously installing the computer program in the computer device or by properly installing, in the computer device, the computer program stored in a non-transitory computer readable medium such as hard disk, memory device, optical disk, etc. or distributed through the network.

A. Sample Data
A.1 Example of Training XML Document

```
<?xml>
<order>
    <product sku="@SKU@" color="@COLOR@">
        <quantity>@QUANTITY@</quantity>
        <price>@PRICE@</price>
    </product>
</order>
```

A.2 Schema-to-Structure Mapping Information Using Substitute Character Strings:

```
/order/product => struct product {
    w_char* sku -> wchar2utf8 | @SKU@;
    w_char* color -> wchar2utf8 | @COLOR@;
    int quantity -> int2string | @QUANTITY@;
    float price -> float2string | @PRICE@;
};
Using relative XPath:
/order/product => struct product {
    w_char* sku -> wchar2utf8 | @sku;
    w_char* color -> wchar2utf8 | @color;
    int quantity -> int2utf8 | quantity/text( );
    float price -> float2utf8 | price/text( );
};
```

A.3 Exemplary Division of a Training XML Document
A.3.1 HEAD Portion

```
<?xml>
<order>
```

A.3.2 BODY Portion

```
<product sku="@SKU@" color="@COLOR@">
<quantity>@QUANTITY@</quantity>
<price>@PRICE@</price>
</product>
```

A.3.3 END Portion
</order>
A.4 Specific Example of Possible XML Document

```
<?xml>
<order>
    <product sku="1JB339" color="white">
        <quantity>40</quantity>
        <price>339.50</price>
    </product>
    <product sku="1JB340" color="black">
        <quantity>25</quantity>
        <price>155.0</price>
    </product>
    <product sku="1JB341" color="green">
        <quantity>30</quantity>
        <price>183.95</price>
    </product>
</order>
```

A.5 Example of XML Schema (Cited from Reference Literature 1)

```
<xs:element name="product">
    <xs:complexType>
        <xs:sequence maxOccurs="2">
            <xs:element name="description" type="xs:string" minOccurs="0"/>
            <xs:element name="quantity" type="xs:integer" />
            <xs:element name="price" type="xs:float" />
        </xs:sequence>
        <xs:attribute name="sku" type="xs:string" use="required" />
        <xs:attribute name="color" type="xs:string" use="optional" />
    </xs:complexType>
</xs:element>
<xs:element name="order">
    <xs:complexType>
        <xs:sequence>
            <xs:element ref="product" maxOccurs="unbounded" />
        </xs:sequence>
    </xs:complexType>
</xs:element>
```

A.6 Example of EXI Grammar (Cited from Reference Literature 1) Complete Grammar for Element <Product>

|  | Event Code |
|---|---|
| Use_color0 : | |
| AT("color") [schema-typed value] Use_color1 | 0 |
| AT("sku") [schema-typed value] Use_sku1 | 1 |
| EE | 2.0 |
| AT(xsi:type) Use_color0 | 2.1 |
| AT(xsi:nil) Use_color0 | 2.2 |
| AT (*) Use_color0 | 2.3 |
| AT("color") [untyped value] Use_color1 | 2.4.0 |
| AT("sku") [untyped value] Use_sku1 | 2.4.1 |
| AT (*) [untyped value] Use_color0 | 2.4.2 |
| SE(*) Use_sku1_copied | 2.5 |
| CH [untyped value] Use_sku1_copied | 2.6 |
| Use_color1 : | |
| AT("sku") [schema-typed value] Use_sku1 | 0 |
| EE | 1.0 |
| AT (*) Use_color1 | 1.1 |
| AT("sku") [untyped value] Use_sku1 | 1.2.0 |
| AT (*) [untyped value] Use_color1 | 1.2.1 |
| SE(*) Use_sku1_copied | 1.3 |
| CH [untyped value] Use_sku1_copied | 1.4 |
| Use_sku1 : | |
| SE("description") Term_description0,1 | 0 |
| SE("quantity") Term_quantity0,1 | 1 |
| EE | 2.0 |
| AT (*) Use_sku1 | 2.1 |
| AT (*) [untyped value] Use_sku1 | 2.2.0 |
| SE(*) Use_sku1_copied | 2.3 |
| CH [untyped value] Use_sku1_copied | 2.4 |
| Use_sku1_copied : | |
| SE("description") Term_description0,1 | 0 |
| SE("quantity") Term_quantity0,1 | 1 |

-continued

| | Event Code |
|---|---|
| EE | 2.0 |
| SE(*) Use_sku1_copied | 2.1 |
| CH [untyped value] Use_sku1_copied | 2.2 |
| Term_description0,1 : | |
| | |
| SE("quantity") Term_quantity0,1 | 0 |
| EE | 1 |
| SE(*) Term_description0,1 | 2.0 |
| CH [untyped value] Term_description0,1 | 2.1 |
| Term_quantity0,1 : | |
| | |
| SE("price") Term_price0,1 | 0 |
| EE | 1 |
| SE(*) Term_quantity0,1 | 2.0 |
| CH [untyped value] Term_quantity0,1 | 2.1 |
| Term_price0,1 : | |
| | |
| SE("description") Term_description1,1 | 0 |
| SE("quantity") Term_quantity1,1 | 1 |
| EE | 2 |
| SE(*) Term_price0,1 | 3.0 |
| CH [untyped value] Term_price0,1 | 3.1 |
| Term_description1,1 : | |
| | |
| SE("quantity") Term_quantity1,1 | 0 |
| EE | 1 |
| SE(*) Term_description1,1 | 2.0 |
| CH [untyped value] Term_description1,1 | 2.1 |
| Term_quantity1,1 : | |
| | |
| SE("price") Term_price1,1 | 0 |
| EE | 1 |
| SE(*) Term_quantity1,1 | 2.0 |
| CH [untyped value] Term_quantity1,1 | 2.1 |
| Term_price1,1 : | |
| | |
| EE | 0 |
| SE(*) Term_price1,1 | 1.0 |
| CH [untyped value] Term_price1,1 | 1.1 |

Complete grammar for element <order>

| Complete grammar for element <order> | |
|---|---|
| Event Code | |
| Term_product 0,0 : | |
|   SE("product") Term_product 1,0 | 0 |
|   EE | 1.0 |
|   AT(xsi:type) Term_product 0,0 | 1.1 |
|   AT(xsi:nil) Term_product 0,0 | 1.2 |
|   AT (*) Term_product 0,0 | 1.3 |
|   AT (*) [untyped value] Term_product 0,0 | 1.4.0 |
|   SE(*) Term_product 0,0_copied | 1.5 |
|   CH [untyped value] Term_product 0,0_copied | 1.6 |
| Term_product 0,0_copied : | |
|   SE("product") Term_product 1,0 | 0 |
|   EE | 1.0 |
|   SE(*) Term_product 0,0_copied | 1.1 |
|   CH [untyped value] Term_product 0,0_copied | 1.2 |
| Term_product 1,0 : | |
|   SE("product") Term_product 1,0 | 0 |
|   EE | 1 |
|   SE(*) Term_product 1,0 | 2.0 |
|   CH [untyped value] Term_product 1,0 | 2.1 |

The invention claimed is:

1. An encoder compiler device including a processor which produces an EXI encoder, the EXI encoder generating an EXI (Efficient XML (Extensible Markup Language) Interchange) stream, the encoder compiler device comprising:
a first reading unit configured to read mapping information that maps a particular point in a document structure defined by an XML schema to a name of a variable;
a second reading unit configured to read a training XML document in which a substitute character string is positioned at the particular point and in which a plurality of tags having at least tag names are included, the training XML document conforming to the XML schema;
a parser configured to parse the training XML document to thereby convert the training XML document into a sequence of events each of which specifies one of the substitute character string and the tag names;
a third reading unit configured to read an EXI grammar form defining a relationship between an inter-event transition and an EXI event code, the EXI grammar being generated based on the XML schema; and
a code composer configured to:
(A) sequentially process the sequence of events obtained by the parser in accordance with the EXI grammar to thereby generate EXI event codes;
(B) when an event being processed is an event which specifies the substitute character string, generate, based on the mapping information, a function for obtaining and outputting from a storage a value of the variable mapped to the particular point at which the substitute character string is positioned; and
(C) produce the EXI encoder by generating and arranging instruction codes based on the generated EXI event codes and the generated function, wherein the generated instruction codes include (i) instruction codes that, when executed by a processor in a second device different from the encoder compiler device, cause the processor in the second device to output the generated EXI event codes and (ii) an instruction code specifying the function that, when executed by the processor in the second device, causes the processor in the second device to obtain and output the value of the variable from the storage which is accessible by the processor in the second device;
wherein the processor in the second device, into which the EXI encoder produced by the encoder compiler device is installed, executes the EXI encoder to thereby obtain the EXI stream which is a sequence of the EXI event codes and the value of the variable without using the XML schema, the training XML document, and the EXI grammar, the obtained EXI stream being equivalent to an EXI stream generated by converting, based on the EXI grammar, an XML document in which the substitute character string in the training XML document is replaced with the value of the variable.

2. The encoder compiler device according to claim 1, wherein the function is further configured to convert the value into a format conforming to the XML schema.

3. The encoder compiler device according to claim 1, wherein the substitute character string is described in a portion surrounded by tags.

4. The encoder compiler device according to claim 1, wherein each of the tags in the training XML document has an attribute, and the substitute character string is described as an attribute value.

5. The encoder compiler device according to claim 1, wherein the parser is an SAX parser, and the events are SAX events.

6. The encoder compiler device according to claim 1, wherein the variable is an element of a structure.

7. The encoder compiler device according to claim 1, wherein the mapping information uses a tag name to specify a range in the training XML document in which the particular point is included, and the code composer divides the sequence of events into a body portion corresponding to the range, a head portion preceding the body portion, and a tail portion following the body portion to perform processing for each of the head portion, the body portion and the tail portion, and concatenates output instruction codes resulting from each processing of the head portion, the body portion and the tail portion to produce the EXI encoder.

8. A communication device comprising:
the EXI encoder produced by the encoder compiler device according to claim 1;
a storage unit configured to store a value of a variable; and
a processor configured to execute the EXI encoder to generate the EXI stream, the EXI stream being a sequence of EXI event codes and the value of the variable.

9. A non-transitory computer readable storage medium storing a program which, when executed by a first processor, produces an EXI encoder which generates an EXI (Efficient XML (Extensible Markup Language) Interchange) stream, the program controlling the first processor to perform functions comprising:
reading-in mapping information that maps a particular point in a document structure defined by an XML schema to a name of a variable;
reading-in a training XML document in which a substitute character string is positioned at the particular point and a plurality of tags having at least tag names are included, the training XML document conforming to the XML schema;
parsing the training XML document to thereby convert the training XML document into a sequence of events each of which specifies one of the substitute character string and the tag names;
reading-in an EXI grammar form defining a relationship between an inter-event transition and EXI event code, the EXI grammar being generated based on the XML schema;
sequentially processing the sequence of events obtained by the parsing in accordance with the EXI grammar to thereby generate EXI event codes;
when an event being processed in the sequential processing is an event which specifies the substitute character string, generating, based on the mapping information, a function for obtaining and outputting from a storage a value of the variable mapped to the particular point at which the substitute character string is positioned; and
producing the EXI encoder by generating and arranging instruction codes based on the generated EXI event codes and the generated function, wherein the generated instruction codes included in the produced EXI encoder include (i) instruction codes that, when executed by a second processor, cause the second processor to output the generated EXI event codes and (ii) an instruction code specifying the function that, when executed by the second processor, causes the second processor to obtain and output the value of the variable from the storage which is accessible by the second processor;
wherein the second processor, which is included in a device into which the produced EXI encoder is installed, executes the EXI encoder to thereby obtain the EXI stream which is a sequence of the EXI event codes and the value of the variable without using the XML schema, the training XML document, and the EXI grammar, the obtained EXI stream being equivalent to an EXI stream generated by converting, based on the EXI grammar, an XML document in which the substitute character string in the training XML document is replaced with the retrieved value of the function.

* * * * *